(12) United States Patent
Kim et al.

(10) Patent No.: US 10,711,757 B2
(45) Date of Patent: Jul. 14, 2020

(54) BATTERY PACK WITH TEMPERATURE SENSING UNIT

(71) Applicant: SAMSUNG SDI CO., LTD., Yongin-si, Gyeonggi-do (KR)

(72) Inventors: Sangkyou Kim, Yongin-si (KR); Sejin Ji, Yongin-si (KR); Woonseong Baek, Yongin-si (KR); Hyeoncheol Jeong, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 975 days.

(21) Appl. No.: 14/817,644

(22) Filed: Aug. 4, 2015

(65) Prior Publication Data
US 2016/0201634 A1 Jul. 14, 2016

(30) Foreign Application Priority Data

Jan. 8, 2015 (KR) ........................ 10-2015-0002848

(51) Int. Cl.
| | | |
|---|---|---|
| *F02N 11/08* | (2006.01) | |
| *F02N 11/14* | (2006.01) | |
| *H01M 10/48* | (2006.01) | |
| *H01M 10/42* | (2006.01) | |
| *H01M 10/44* | (2006.01) | |

(Continued)

(52) U.S. Cl.
CPC ...... *F02N 11/0862* (2013.01); *F02N 11/0848* (2013.01); *F02N 11/14* (2013.01); *H01M 10/425* (2013.01); *H01M 10/443* (2013.01); *H01M 10/486* (2013.01); *F02N 11/12* (2013.01); *F02N 2200/062* (2013.01); *F02N 2200/063* (2013.01); *F02N 2200/064* (2013.01); *H02J 7/0063* (2013.01); *H02J 2007/0067* (2013.01)

(58) Field of Classification Search
CPC ........................ F02N 11/0862; H02J 7/0063
USPC .................................................. 320/134–136
See application file for complete search history.

(56) References Cited

U.S. PATENT DOCUMENTS 5,561,362 A * 10/1996 Kawamura ........ G01R 31/3648
320/134
5,717,310 A * 2/1998 Sakai .................. B60L 11/1862
307/10.1
(Continued)

FOREIGN PATENT DOCUMENTS

| | | |
|---|---|---|
| JP | 2009-140771 | 6/2009 |
| KR | 10-2010-0090198 | 8/2010 |
| KR | 10-2012-0013776 | 2/2012 |

*Primary Examiner* — Robert Grant
*Assistant Examiner* — Tessema Kebede
(74) *Attorney, Agent, or Firm* — Lee IP Law, P.C.

(57) ABSTRACT

A battery pack including a battery, a sensor, a controller, and a self-discharge circuit. The battery includes at least one battery cell connected between a pair of external terminals. The at least one battery cell is used for an engine-start attempt. The sensor detects a temperature of the battery. The controller compares the temperature of the battery with a reference temperature value and outputs a self-discharge signal when the temperature of the battery is lower than the reference temperature value. The self-discharge circuit is connected between the pair of external terminals in parallel with the battery and performs self-discharge the battery based on the self-discharge signal.

11 Claims, 7 Drawing Sheets

(51) Int. Cl.
*H02J 7/00* (2006.01)
*F02N 11/12* (2006.01)

(56) References Cited

U.S. PATENT DOCUMENTS

| | | | | |
|---|---|---|---|---|
| 6,025,699 | A * | 2/2000 | Cummings | H02J 7/0011 320/112 |
| 8,207,705 | B2 * | 6/2012 | Nagashima | H02J 7/027 180/65.21 |
| 9,122,470 | B2 * | 9/2015 | Yen | G06F 1/263 |
| 2002/0078914 | A1 * | 6/2002 | Manabe | F02N 11/0862 123/179.3 |
| 2007/0013347 | A1 * | 1/2007 | Kamohara | B60K 6/48 320/160 |
| 2009/0115419 | A1 * | 5/2009 | Ueda | G01R 31/3624 324/430 |
| 2010/0194346 | A1 * | 8/2010 | Lee | H02J 7/0031 320/134 |
| 2012/0004873 | A1 * | 1/2012 | Li | B60L 3/0046 702/63 |
| 2012/0032639 | A1 | 2/2012 | Kim et al. | |
| 2014/0253046 | A1 * | 9/2014 | Poznar | H02J 7/0063 320/136 |

* cited by examiner

BATTERY PACK WITH TEMPERATURE SENSING UNIT

CROSS-REFERENCE TO RELATED APPLICATION

Korean Patent Application No. 10-2015-0002848, filed on Jan. 8, 2015, entitled, "Battery Pack," is incorporated by reference herein in its entirety.

BACKGROUND

1. Field

One or more embodiments relate to a battery pack.

2. Description of the Related Art

A secondary battery is a rechargeable battery that converts chemical energy to electrical energy and also converts electrical energy to chemical energy. A secondary battery has been used for a variety of applications. One application is to power vehicles such as cars and motorcycles. These vehicles produce mechanical energy using engines. In order to properly operate, the engines may be started using electrical energy from lead storage batteries. However, these types of batteries are heavy and bulky.

SUMMARY

In accordance with one or more embodiments, a battery pack includes a battery including at least one battery cell connected between a pair of external terminals, the at least one battery cell to be used for an engine-start attempt; a sensor to detect a temperature of the battery; a controller to compare the temperature of the battery with a reference temperature value and to output a self-discharge signal when the temperature of the battery is lower than the reference temperature value; and a self-discharge circuit connected between the pair of external terminals in parallel with the battery, the self-discharge circuit to self-discharge the battery based on the self-discharge signal.

The sensor may detect a current of the battery and the controller may determine that an engine-start attempt was made when the current of the battery becomes higher than a reference current value. The sensor may detect a current and a voltage of the battery and the controller may detect that an engine-start attempt was made but failed when the voltage of the battery is lower than a reference voltage value and the current of the battery becomes higher than a reference current value.

The controller may detect that an engine-start attempt was made when the current of the battery becomes higher than the reference current value; detect that the engine-start attempt failed when the voltage of the battery is lower than the reference voltage value and the current of the battery becomes higher than the reference current value; detect that the engine-start attempt was completed when the current of the battery becomes lower than the reference current value; compare the temperature of the battery with the reference temperature value; and output a self-discharge signal to the self-discharge circuit to self-discharge the battery when the temperature of the battery is lower than the reference temperature value.

The sensor may detect a current and a voltage of the battery, and the controller may detect that an engine-start attempt was made when the current of the battery becomes higher than a reference current value and then falls below the reference current value; determine whether the engine-start attempt has succeeded by comparing a first voltage of the battery measured before the current of the battery becomes higher than the reference current value with a second voltage of the battery measured after the current of the battery becomes lower than the reference current value; determine that the engine-start attempt has failed when the second voltage is lower than the first voltage; compare the temperature of the battery with the reference temperature value; and output a self-discharge signal to the self-discharge circuit to self-discharge the battery when the temperature of the battery is lower than the reference temperature value.

The controller may monitor the temperature of the battery while outputting the self-discharge signal, and stop outputting the self-discharge signal when the temperature of the battery becomes equal to or higher than the reference temperature value. The controller may output the self-discharge signal and stop outputting the self-discharge signal after a predetermined time period based on an initial temperature of the battery compared with the reference temperature value.

The battery may be self-discharged to generate heat during the predetermined time period, and the heat may be generated in a sufficient amount that the temperature of the battery is equal to or higher than the temperature reference value after the predetermined time period. The controller may store information indicative of the predetermined time period during which the self-discharge signal is output based on the initial temperature of the battery.

The self-discharge circuit may include a self-discharge switch to connect the pair of external terminals based on the self-discharge signal. The self-discharge circuit may include a self-discharge switch and a self-discharge resistor that are connected in series between the pair of external terminals, and the self-discharge switch may be turned on or off based on the self-discharge signal.

In accordance with one or more other embodiments, a battery pack includes a battery including at least one battery cell connected between the pair of external terminals; a sensor to detect a temperature of the battery; a controller to perform control based on an engine-start preparation signal received through a signal terminal, the controller to compare the temperature of the battery with a reference temperature value and to output a self-discharge signal when the temperature of the battery is lower than the reference temperature value; and a self-discharge circuit connected between the pair of external terminals in parallel with the battery, the self-discharge circuit to self-discharge the battery based on the self-discharge signal. The controller may stop outputting the self-discharge signal when the temperature of the battery becomes equal to or higher than the reference temperature value. The self-discharge circuit may include a self-discharge switch to connect the pair of external terminals based on the self-discharge signal.

In accordance with one or more other embodiments, a vehicle includes a battery pack in accordance with one or more of the embodiments described herein, the engine starter connected to the battery pack, and an engine to be started by the engine starter.

In accordance with one or more other embodiments, an apparatus includes an interface; and a controller to control an engine-start attempt, the controller to compare a temperature of a battery for the engine-start attempt with a reference temperature and to generate a self-discharge signal when the temperature of the battery is lower than the reference temperature, the self-discharge signal to be output through the interface to control a self-discharge circuit for the battery.

The controller may receive instructions for the engine-start attempt from a storage area in or coupled to the controller. The self-discharge signal may control the self-discharge circuit to self-discharge the battery for a period of time until the temperature of the battery equals or exceeds the reference temperature. The period of time may include a period for heat generated by self-discharge of the battery to raise the temperature of the battery to equal or exceed the reference temperature. The reference temperature maybe based on a temperature range in which the battery is unable to output sufficient voltage for the engine-start attempt.

In accordance with one or more embodiments, a computer-readable medium stores code for operating a controller to perform an engine-start operation of a vehicle, the code includes first code to compare a temperature of a battery for an engine-start attempt with a reference temperature; and second code to generate a self-discharge signal when the temperature of the battery is lower than the reference temperature, the self-discharge signal to be output through the interface to control a self-discharge circuit for the battery.

In accordance with one or more embodiments, a method for controlling an engine-start operation includes storing code in a storage area, the code including: first code to compare a temperature of a battery for an engine-start attempt with a reference temperature; and second code to generate a self-discharge signal when the temperature of the battery is lower than the reference temperature, the self-discharge signal to be output through the interface to control a self-discharge circuit for the battery.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments. Like reference numerals refer to like elements throughout.

Figure 1:
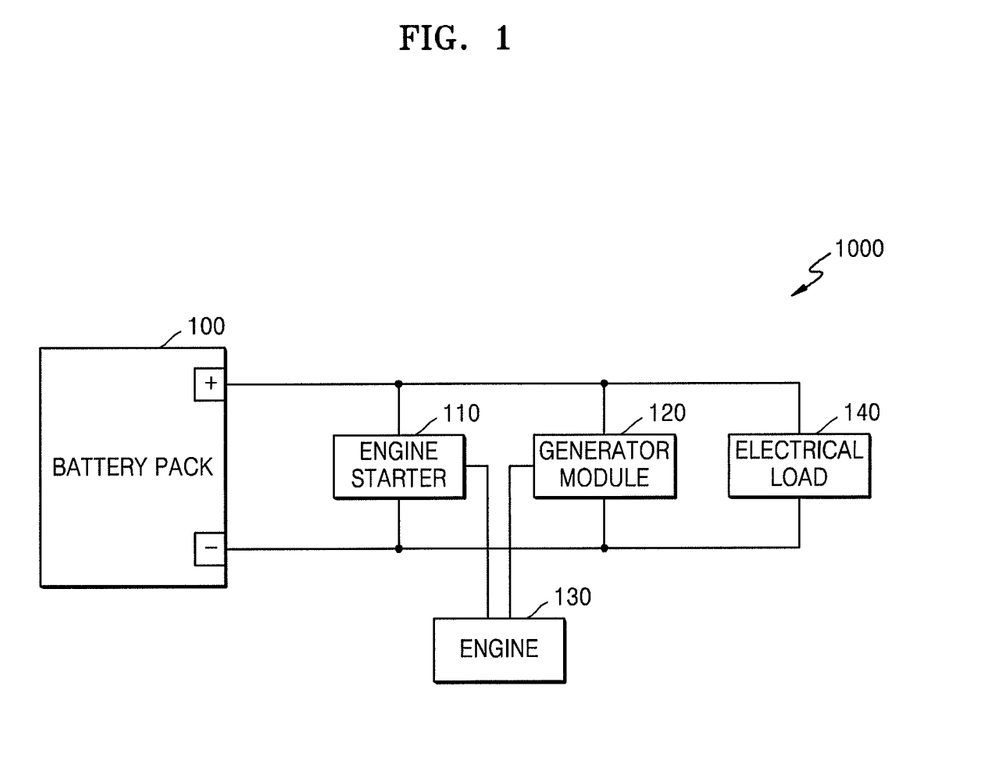
FIG. 1 illustrates an embodiment of a vehicle.

FIG. 1 illustrates an embodiment of a vehicle 1000 which includes a battery pack 100, an engine starter 110, a generator module 120, an engine 130, and an electrical load 140. The vehicle 1000 may be, for example, an automobile or a motorcycle that transports people using mechanical energy generated by the engine 130.

The battery pack 100 which stores electrical energy based on current from the generator module 120 and which supplies electrical energy to the engine starter 110 and the electrical load 140. The battery pack 100 may include, for example, a lithium ion battery. The lithium ion battery is relatively light and small compared to a lead storage battery having the same charge capacity. Therefore, the vehicle 1000 may have improved fuel efficiency and space of the vehicle 1000 may be efficiently used.

In operation, the internal resistance of a lithium ion battery may increase as temperature decreases. For example, the output voltage of the lithium ion battery may be low for low temperatures, e.g., 0° C. or lower. As a result, the lithium ion battery may not be able to start the engine 130 in this temperature range.

To address this issue, it is noted that battery pack 100 including the lithium ion battery generates heat when discharged. Thus, in accordance with one embodiment, the battery pack 100 may self-discharge in low-temperature environments to ensure that the battery pack 100 is able to start the engine 130.

The engine 130 converts thermal energy generated by fuel combustion to mechanical energy. Mechanical energy generated by the engine 130 is transmitted to the wheels to move the vehicle 1000. The mechanical energy may be transmitted from the engine 130 to the wheels through driving axles or chains.

The engine starter 110 provides initial rotation energy for a crankshaft of the engine 130 to start the engine 130. The engine starter 110 may be referred to as a starting motor. The engine starter 110 may require a considerably large current (e.g., about 50 A to 500 A) for generating rotation energy from electrical energy. The battery pack 100 supplies such a large current to the engine starter 110. Once the engine 130 is started, no current may be supplied to the engine starter 110.

The generator module 120 converts mechanical energy generated by the engine 130 to electrical energy and supplies the electric energy to the battery pack 100 or the electrical load 140.

The electrical load 140 is a component or a group of components of the vehicle 1000 that consumes electrical energy. For example, the electrical load 140 may be an electronic device such as a control device, a navigation system, an audio device, an illumination lamp, an automobile black box, or an automobile anti-theft device. The number and type of components that correspond to the electrical load 140 may vary depending on embodiments of the vehicle 1000. The battery pack 100 may supply electricity to the electrical load 140.

Figure 2:
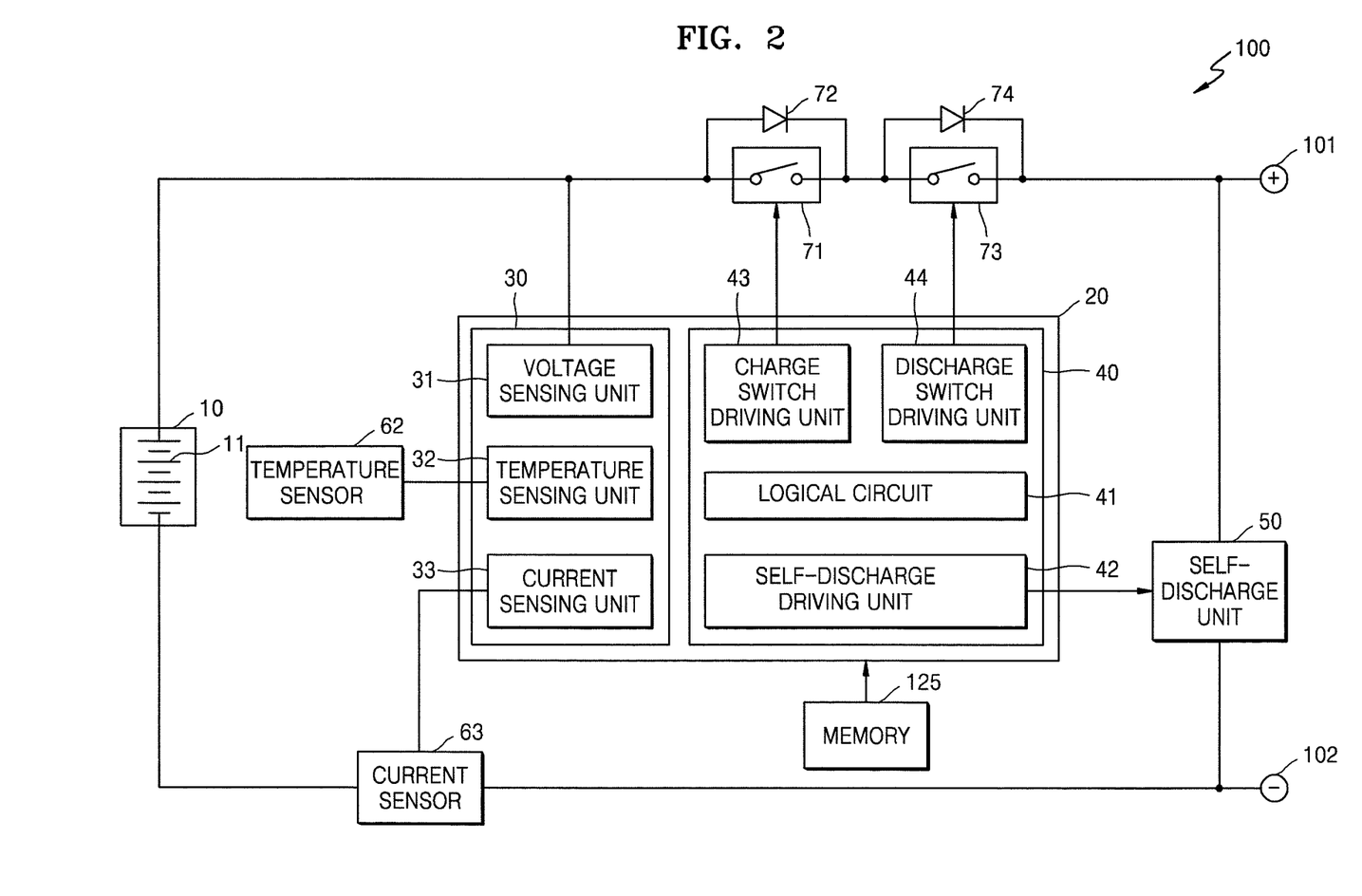
FIG. 2 illustrates an embodiment of a battery pack.

FIG. 2 illustrates and embodiment of the battery pack 100 which includes a pair of first and second external terminals 101 and 102. The first external terminal 101 may be a positive terminal of the battery pack 100. The second external terminal 102 may be a negative terminal of the battery pack 100. As shown in FIG. 1, the battery pack 100 may be connected to the engine starter 110 through the first and second external terminals 101 and 102. The battery pack 100 supplies a considerably large current to the engine starter 110 when the engine starter 110 starts the engine 130.

The battery pack 100 also includes a battery 10, a sensing unit 30, a control unit 40, and a self-discharge unit 50. The battery 10 is a device for storing electrical energy which is connected between the pair of first and second external terminals 101 and 102. The battery 10 may include, for example, one or more battery cells 11. In the example embodiment of FIG. 2, the battery 10 includes four battery cells 11. The battery cells 11 may be connected in series, parallel, or in series-parallel configuration. The number and methods for connecting the battery cells 11 of the battery 10 may be determined, for example, based on a required output voltage, a required electrical storage capacity, or the type of the battery cells 11.

The battery cells 11 may include rechargeable secondary battery cells, e.g., lithium ion battery cells, nickel-cadmium battery cells, nickel metal hydride (NiMH) battery cells, and/or lithium polymer battery cells.

The battery cells 11 may be modeled as an internal resistor connected to a voltage source. For example, if the battery cells 11 are lithium ion battery cells, the internal resistance of the battery cells 11 varies according to the temperature of the battery cells 11, e.g., the internal resistance of the battery cells 11 may increase as the temperature of the battery cells 11 decreases. Therefore, when an electrical load having a constant resistance value is connected between a positive electrode and a negative electrode of the battery cells 11, a large voltage drop may occur due to the internal resistance of the battery cells 11 when the temperature of the battery cells 11 decreases.

As a result, the voltage applied to the electrical load may decrease to a lower voltage. The lower voltage may be lower than a level required for properly operating the electrical load. Thus, the electrical load may not operate in a normal manner under these conditions. For example, if the electrical load is the engine starter 110, a voltage lower than a level required by the engine starter 110 may be applied to the engine starter 110 when the battery cells have a low temperature. Thus, the engine 130 connected to the engine starter 110 may not start.

In one embodiment, the battery pack 100 may be an engine-starting battery pack and the rated voltage of the battery pack 100, for example, may be 12 V. At least 8 V may have to be applied to the engine starter 110 for normal operation of the engine starter 110. If the temperature of the battery pack 100 is low (e.g., 0° C. or lower), the output voltage of the battery pack 100 may be lower than 8 V. Consequently, the engine starter 110 connected to the battery pack 100 may not generate rotation energy sufficient to start the engine 130. Thus, the engine 130 may fail to start.

In one embodiment, the battery pack 100 includes a protective circuit 20 for managing the battery 10 and for controlling charging and discharging operations of the battery pack 100. The protective circuit 20 includes the sensing unit 30 to detect various statues such the voltage, temperature, and/or current of the battery 10. The protective circuit 20 may include the control unit 40. If an abnormal situation (e.g., low-voltage, high-voltage, overcurrent, and/or overheating) occurs in the battery 10, the control unit 40 may detect the abnormal situation and control charging and discharging operations of the battery pack 100 accordingly.

The control unit 40 may determine, for example, the state of charge (SOC) or state of health (SOH) of the battery 10 or the battery cells 11, based on cell voltages, temperatures, and/or currents measured by the sensing unit 30. The control unit 40 may perform a cell balancing operation on the battery cells 11 based on the cell voltages measured by the sensing unit 30. The protective circuit 20 may be referred to, for example, as a micro controller unit or a battery management system.

The sensing unit 30 includes a voltage sensing unit 31 for measuring the output voltage of the battery 10, a temperature sensing unit 32 for measuring the temperature of the battery 10, and a current sensing unit 33 for measuring charge and discharge currents of the battery 10. The battery pack 100 may include a voltage sensor, a temperature sensor 62, and a current sensor 63 to measure the voltage, temperature, and current of the battery 10, respectively. The voltage sensing unit 31 may measure cell voltages of the battery cells 11.

If the control unit 40 detects an attempt to start the engine 130 using the battery pack 100, the control unit 40 may compare the temperature of the battery 10 with a reference temperature value. If the temperature of the battery 10 is lower than the reference temperature value, the control unit 40 outputs a self-discharge signal.

The control unit 40 includes a logical circuit 41 and a self-discharge driving unit 42. The logical circuit 41 detects an engine-start attempt based on the voltage, temperature, and/or current of the battery 10 measured by the sensing unit 30, and then determines whether to output a self-discharge signal based on the temperature of the battery 10. The self-discharge driving unit 42 outputs the self-discharge signal under the control of the logical circuit 41.

The control unit 40 includes a charge switch driving unit 43 for controlling a charge switch 71 and a discharge switch driving unit 44 for controlling a discharge switch 73. The charge switch driving unit 43 and the discharge switch driving unit 44 are used to manipulate the charge switch 71 and the discharge switch 73 under the control of the logical circuit 41. The battery pack 100 includes the charge switch 71 and the discharge switch 73 connected in series to an external terminal of the battery 10, for example, the first external terminal 101 in FIG. 2. In FIG. 2, the charge switch 71 and the discharge switch 73 are connected between a positive electrode and the first external terminal 101 of the battery 10. In another embodiment, the charge switch 71 and discharge switch 73 may be connected between a negative electrode and the second external terminal 102 of the battery 10. The battery pack 100 may include a first diode 72 connected in parallel with the charge switch 71 and a second diode 74 connected in parallel with the discharge switch 73.

During a charging operation, if the battery pack 100 becomes abnormal (e.g., the voltage of the battery 10 exceeds an overcharge reference voltage value), the control unit 40 may control the charge switch driving unit 43 to open the charge switch 71. During a discharging operation, if the battery pack 100 becomes abnormal (e.g., the voltage of the battery 10 becomes lower than an overdischarge reference voltage value), the control unit 40 may control the discharge switch driving unit 44 to open the discharge switch 73. If the battery pack 100 becomes abnormal (e.g., the temperature of the battery 10 exceeds a high temperature reference value), the control unit 40 may control the charge switch driving unit 43 and the discharge switch driving unit 44 to open both the charge switch 71 and discharge switch 73.

In the exemplary embodiment, the control unit 40 is illustrated as controlling all elements of the battery pack 100. In another embodiment, the battery pack 100 may include an analog front-end for monitoring the state of the battery pack 100 and controlling operations of the charge switch 71 and the discharge switch 73. In this case, the control unit 40 may control the analog front-end. The analog front-end may include the sensing unit 30.

The self-discharge unit 50 is connected between the pair of first and second external terminals 101 and 102, in parallel with the battery 10, for self-discharging the battery 10 based on a self-discharge signal from the control unit 40. Based on the self-discharge signal, the self-discharge unit 50 may form a closed circuit by connecting the first and second external terminals 101 and 102. Then, the battery 10 is discharged through the closed circuit including the self-discharge unit 50. If it is assumed that the self-discharge unit 50 does not have resistance, most electrical energy discharged from the battery 10 may be consumed by the internal resistance of the battery 10. Thus, the battery 10 may generate heat. The heat increases the temperature of the battery 10 and the internal resistance of the battery 10 may decrease as described above. In this manner, the temperature of the battery 10 may be increased to a value higher than the reference temperature value and the internal resistance of the battery 10 may be decreased. As a result, the battery 10 may output a voltage sufficient for starting the engine 130.

Figure 3A:
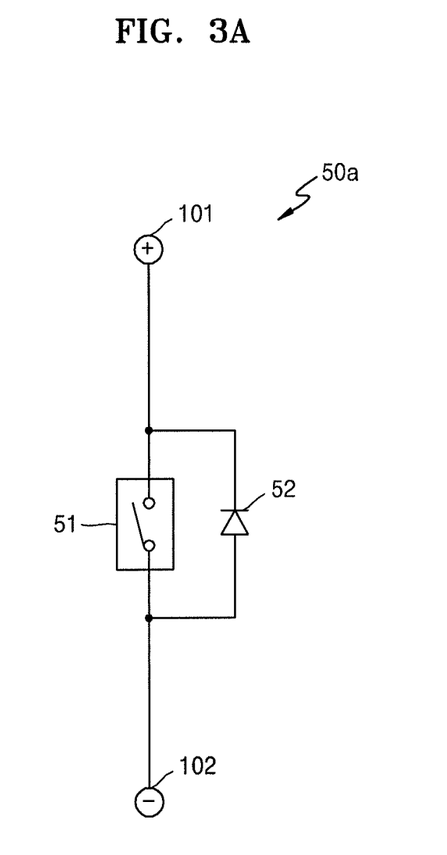
FIGS. 3A and 3B illustrate embodiments of a self-discharge unit.
Figure 3B:
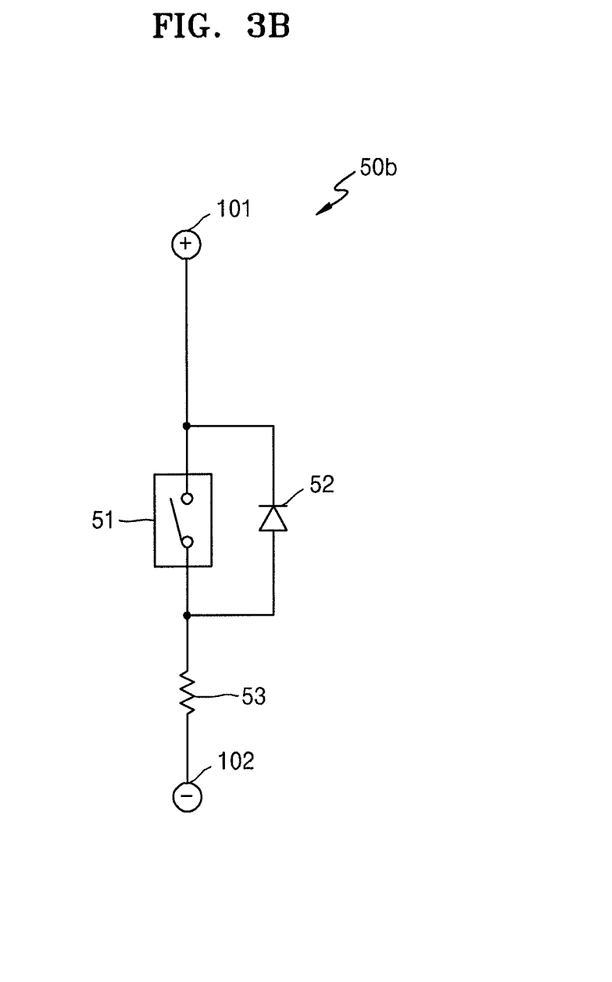

FIGS. 3A and 3B illustrates embodiments of the self-discharge unit 50 in FIG. 2.

Referring to FIG. 3A, a self-discharge unit 50a includes a self-discharge switch 51 that is controlled by a self-discharge signal from the control unit 40 and a diode 52 connected in parallel with the self-discharge switch 51. The self-discharge switch 51 may include, for example, a field effect transistor. The self-discharge switch 51 may be turned on based on the self-discharge signal, e.g., may be turned on when the self-discharge switch 51 receives a self-discharge signal and may be turned off when the self-discharge switch 51 does not receive a self-discharge signal.

When the self-discharge switch 51 is turned on, the self-discharge unit 50a does not have resistance. Therefore, when the self-discharge switch 51 is turned on, electrical energy output from the battery 10 is consumed by the internal resistance of the battery 10. Since the internal resistance of the battery 10 is considerably high at low temperatures (e.g., 0° C. or lower), current output from the battery 10 may be similar to or slightly higher than a current output from the battery 10 in an engine-start operation.

Referring to FIG. 3B, a self-discharge unit 50b includes a self-discharge switch 51, a diode 52, and a self-discharge resistor 53. The self-discharge switch 51 and the diode 52 are connected in parallel with each other, and the self-discharge resistor 53 is connected in series to the self-discharge switch 51. The self-discharge resistor 53 prevents the battery 10 from outputting an excessively high current when the self-discharge switch 51 is turned on. Unlike the internal resistance of the battery 10, the resistance of the self-discharge resistor 53 increases as temperature increases. The self-discharge resistor 53 may include, for example, a positive temperature coefficient (PTC) thermistor having a resistance which increases as temperature increases.

As described above, when the self-discharge switch 51 is turned on, the battery 10 and the self-discharge unit 50b form a closed circuit. Then, the battery 10 undergoes self-discharge and generates heat to increase the temperature of the battery 10. As the temperature of the battery 10 increases, the internal resistance of the battery 10 decreases and thus the battery 10 outputs higher current. In this example, the self-discharge unit 50b includes the self-discharge resistor 53 including a PTC thermistor. Therefore, when the temperature of the battery 10 increases, the resistance of the self-discharge resistor 53 also increases. Thus, the battery 10 may not output a steeply increased current even though the temperature of the battery 10 increases.

Referring again to FIG. 2, the logical circuit 41 receives information indicative of the voltage, temperature, and/or current of the battery 10 measured by the sensing unit 30. The logical circuit 41 may detect events such as an engine-start attempt or the result of the engine-start attempt based on one or more of the voltage, temperature, or current of the battery 10. The battery pack 100 in FIG. 2 does not include a signal terminal connected to an external device for communication. Therefore, the battery pack 100 may not receive information about an engine-start attempt or failure of the engine-start attempt. In one embodiment, the logical circuit 41 may extract information corresponding to starting the engine 130 based on data measured using the sensing unit 30 and may control the self-discharge unit 50 through the self-discharge driving unit 42 based on the extracted information.

For example, if the logical circuit 41 detects an engine-start attempt based on data measured using the sensing unit 30, the logical circuit 41 compares the temperature of the battery 10 with the reference temperature value. The reference temperature value may be a temperature value at which the output voltage of the battery 10 is sufficiently high for starting the engine 130. For example, the reference temperature value may be set to be 10° C., 20° C., or 25° C.

When the temperature of the battery 10 is lower than the reference temperature value, the logical circuit 41 may output a self-discharge signal. Based on the self-discharge signal, the self-discharge unit 50 connects the first and second external terminals 101 and 102 to form a closed circuit in the battery pack 100 and thus to discharge the battery 10. The battery 10 generates heat while being discharged. As a result, the temperature of the battery 10 increases until the battery 10 enters into a state in which the engine 130 is able to be started using the battery 10.

In another example, the logical circuit 41 may detect an engine-start attempt based on a discharge current of the battery 10 measured by the sensing unit 30. For example, when the discharge current of the battery 10 exceeds a reference current value, the logical circuit 41 may detect that there was an engine-start attempt. When the engine 130 is started, the battery pack 100 supplies a sufficiently high current to the engine starter 110, and the engine starter 110 converts the current to mechanical energy to rotate the crankshaft of the engine 130. When the engine 130 is started, the battery pack 100 may supply a sufficiently high current (e.g., ranging from about 50 A to about 500 A) to the engine starter 110 depending on the type of the engine starter 110. Before the engine 130 is started, the discharge current of the battery pack 100 is not higher than the discharge current of the battery pack 100 when the engine 130 is started. The reference current value may be selected from the range of about 50 A to about 500 A depending on the type of the engine starter 110. For example, the reference current value may be set to be 100 A.

The logical circuit 41 may compare the discharge current of the battery 10 with the reference current value. When the discharge current of the battery 10 exceeds the reference current value, the logical circuit 41 may detect that there was an engine-start attempt. Then, the logical circuit 41 may compare the temperature of the battery 10 with the reference temperature value. When the temperature of the battery 10 is lower than the reference temperature value, the logical circuit 41 may output a self-discharge signal to the self-discharge unit 50.

In another example, the logical circuit 41 may detect an engine-start attempt and the result of the engine-start attempt based on the discharge current and output a voltage of the battery 10 measured by the sensing unit 30. As described above, when the output voltage of the battery 10 is lower than a reference voltage value when the discharge current of the battery 10 exceeds the reference current value, the logical circuit 41 may determine that an engine-start attempt was made but failed. The reference voltage value may be a voltage value at which the engine starter 110 normally operates. The reference voltage value may vary depending on the engine starter 110. For example, the reference voltage value may be set to be 8 V.

As described above, when the engine 130 is started, the discharge current of the battery 10 is higher than the reference current value. However, at this time, if the output voltage of the battery 10 is lower than the reference voltage value due to the internal resistance of the battery 10, the engine 130 is not started. The logical circuit 41 may compare the temperature of the battery 10 with the reference temperature value. When the temperature of the battery 10 is lower than the reference temperature value, the logical circuit 41 may output a self-discharge signal to the self-discharge unit 50 to increase the temperature of the battery 10 to a value higher than the reference temperature value.

In another example, the logical circuit 41 may output a self-discharge signal after an engine-start attempt is completed. When the discharge current of the battery 10 exceeds the reference current value and then falls below the reference current value, the logical circuit 41 may determine that an engine-start attempt is completed. After the discharge current of the battery 10 falls below the reference current value, the logical circuit 41 may output a self-discharge signal to the self-discharge unit 50.

For example, the logical circuit 41 may perform a battery pack operating method as follows. When the current of the battery 10 exceeds the reference current value, the method includes detecting that an engine-start attempt was made. When the output voltage of the battery 10 is lower than the reference voltage value when the current of the battery 10 is higher than the reference current value, the method includes detecting that the engine-start attempt failed.

When the current of the battery 10 is lower than the reference current value, the method includes detecting that the engine-start attempt was completed and comparing the temperature of the battery 10 with the reference temperature value. When the temperature of the battery 10 is lower than the reference temperature value, a self-discharge signal is output to the self-discharge unit 50 to self-discharge the battery 10.

In another example, as described above, the logical circuit 41 may determine the occurrence of an engine-start attempt based on the current of the battery 10. The logical circuit 41 may determine the result of the engine-start attempt based on a voltage of the battery 10 before the engine-start attempt (e.g., a first voltage) and a voltage of the battery 10 after the engine-start attempt (e.g., a second voltage). Once the engine 130 is started, the engine 130 rotates by itself using fuel and the generator module 120 converts mechanical energy generated by the engine 130 to electric energy to charge the battery pack 100.

After the engine 130 is successfully started, the voltage of the battery 10 exceeds the voltage of the battery 10 before the engine 130 is started. Therefore, if the second voltage after the engine-start attempt is higher than the first voltage before the engine-start attempt by a preset value (for example, about 0.1 V), the logical circuit 41 may determine that the engine-start attempt succeeded. However, if the second voltage measured after the engine-start attempt is similar to or lower than the first voltage measured before the engine-start attempt, the logical circuit 41 may determine that the engine-start attempt failed.

For example, the logical circuit 41 may perform a battery pack operating method as follows. When the current of the battery 10 is higher than the reference current value and then becomes lower than the reference current value, the method includes detecting that an engine-start attempt was made and determining whether the engine-start attempt succeeded. This determined is performed by comparing a first voltage of the battery 10 measured before the current of the battery 10 exceeds the reference current value with a second voltage of the battery 10 measured after the current of the battery 10 becomes lower than the reference current value.

If the second voltage is lower than the first voltage, the method includes determining that the engine-start attempt failed and comparing the temperature of the battery 10 with the reference temperature value. When the temperature of the battery 10 is lower than the reference temperature value, the method includes outputting a self-discharge signal to the self-discharge unit 50 to self-discharge the battery 10.

In another example, the logical circuit 41 may determine a time at which a self-discharge signal is output. For example, the logical circuit 41 may detect the temperature of the battery 10 while outputting a self-discharge signal. When the temperature of the battery 10 exceeds the reference temperature value, the logical circuit 41 may stop outputting the self-discharge signal. The reference temperature value may be, for example, 10° C., 20° C., or 25° C. In the present example, the battery 10 may not overheat, a condition which may occur if the approach taken by the embodiments disclosed herein are not performed.

In another example, the logical circuit 41 may determine whether to output a self-discharge signal. The self-discharge signal may be output for a predetermined time period based on an initial temperature of the battery 10 compared with the reference temperature value. As described above, if the logical circuit 41 detects an engine-start attempt, the logical circuit 41 may compare the temperature of the battery 10 with the reference temperature value. When the temperature of the battery 10 is lower than the reference temperature value, the logical circuit 41 may output a self-discharge signal. At this time, the temperature of the battery 10, compared with the reference temperature value, may be referred to as an initial temperature of the battery 10. For example, the logical circuit 41 may start to output a self-discharge signal and may stop outputting the self-discharge signal after a predetermined time period based on the initial temperature of the battery 10.

The logical circuit 41 may receive information about a time period during which the logical circuit 41 outputs a self-discharge signal based on the initial temperature of the battery 10, so as to increase the temperature of the battery 10 to the reference temperature value. For example, if the initial temperature of the battery 10 is −20° C., the self-discharge signal may be output for 10 seconds. If the initial temperature of the battery 10 is −10° C., the self-discharge signal may be output for 8 seconds. If the initial temperature of the battery 10 is 0° C., the self-discharge signal may be output for 5 seconds. If the initial temperature of the battery 10 is 10° C., the self-discharge signal may be output for 3 seconds. The logical circuit 41 may store information about output time periods of a self-discharge signal according to the initial temperature of the battery 10.

Based on the self-discharge signal, the self-discharge unit 50 may perform a self-discharging operation for the predetermined time period as described above, and then the battery 10 may generate heat. As a result, after the predetermined time period, the temperature of the battery 10 may become equal to or higher than the reference temperature value.

Figure 4:
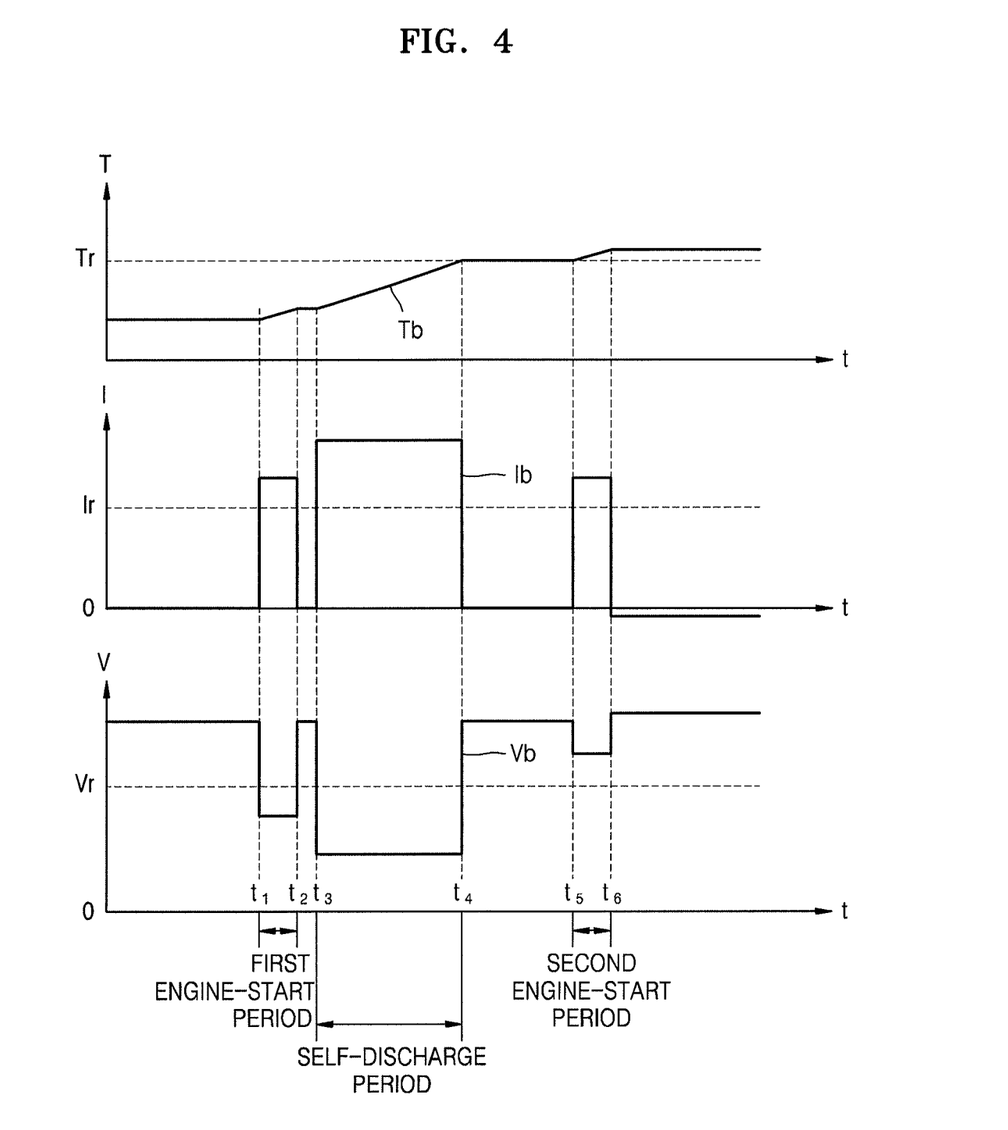
FIG. 4 illustrates example waveforms for the battery pack.

FIG. 4 illustrates examples of voltage, current, and temperature waveforms for the battery 10 when the battery pack 100 is operated by an operation method according to one or more embodiments. In one embodiment, one or more of the voltage, current, or temperature waveforms may be used to control the battery 10 or all three may be used.

Referring to FIG. 4, the voltage, current, and temperature of the battery 10 are illustratively shown to explain a method of self-discharging the battery pack 100 in FIG. 2. In FIG. 4, the uppermost graph shows the temperature Tb of the battery 10 with respect to time, and the middle graph shows the current Ib of the battery 10 with respect to time. It is assumed that current values higher than 0 are discharge current values of the battery 10 and current values lower than 0 are charge current values of the battery 10. In FIG. 4, the last graph shows the voltage Vb of the battery 10 with respect to time. In the graphs of FIG. 4, Tr, Ir, and Vr respectively denote reference temperature value, a reference current value, and a reference voltage value.

A first engine-start attempt is made during a first engine-start period between a first time t1 and a second time t2. Since no engine-start attempt is made before the first time t1, the voltage Vb and current Ib of the battery 10 do not vary and the temperature Tr of the battery 10 is lower than the reference temperature value Tr.

When a user tries to start the vehicle 1000 at the first time t1, a considerably high current starts to flow from the battery pack 100 to the engine starter 110. As a result, the current Ib of the battery 10 exceeds the reference current value Ir at the first time t1. As described above, since the temperature Tb of the battery 10 is lower than the reference temperature value Tr, the internal resistance of the battery 10 is high. Due to a voltage drop corresponding to the product of the internal resistance and the current the voltage Vb of the battery 10 falls below the reference voltage value Vr. Therefore, a sufficiently high voltage is not applied to the engine starter 110 and the engine-start attempt fails.

According to the exemplary embodiment, the logical circuit 41 may determine that the engine-start attempt has failed when the logical circuit 41 detects that the current Ib is higher than the reference current value Ir but the voltage Vb is lower than the reference voltage value Vr.

The user may return an engine-starting device to an original position at the second time t2. For example, at the second time t2, the user may turn an ignition key back to an "ON" position or may take his/her finger off an engine-start button. Then, since the current Ib flowing from the battery pack 100 to the engine starter 110 is interrupted, the current Ib reduces to 0 and the voltage Vr increases to an original value. During the first engine-start period between the first time t1 and the second time t2, since the current Ib flows through the battery 10 having internal resistance, the battery 10 generates heat and thus the temperature Tb of the battery 10 may be slightly increased, as shown in FIG. 4.

According to the exemplary embodiment, the logical circuit 41 may compare the temperature Tb of the battery 10 with the reference temperature value Tr. Since the temperature Tb of the battery 10 is lower than the reference temperature value Tr, the logical circuit 41 may output a self-discharge signal at a third time t3. During a self-discharge period between the third time t3 and a fourth time t4, the logical circuit 41 may output the self-discharge signal to the self-discharge unit 50. Based on the self-discharge signal, the self-discharge unit 50 may self-discharge the battery 10.

According to the exemplary embodiment, the self-discharge period during which the self-discharge signal is output may be preset based on the temperature Tb of the battery 10 at the second time t2, and this presetting information may be stored in the logical circuit 41. As a result, the temperature Tb of the battery 10 reaches the reference temperature value Tr at the fourth time t4. In another exemplary embodiment, the logical circuit 41 may detect the temperature Tb of the battery 10 and may stop outputting the self-discharge signal at the moment when the temperature Tb of the battery 10 reaches the reference temperature value Tr, that is, at the fourth time t4.

During the self-discharge period, the vehicle 1000 may detect self-discharging of the battery pack 100 based on a voltage or resistance between the first and second external terminals 101 and 102 of the battery pack 100. In another exemplary embodiment, the battery pack 100 may output the self-discharge signal to the vehicle 1000 and the vehicle 1000 may detect self-discharging of the battery pack 100 based on the self-discharge signal. The vehicle 1000 may inform the user of the self-discharging of the battery pack 100.

The user may make a second engine-start attempt at a fifth time t5 after the self-discharge period. As shown in FIG. 4, since the temperature Tb of the battery 10 has reached the reference temperature value Tr, the current Ib and voltage Vb of the battery 10 may be higher than the reference current value Ir and the reference voltage value Vr, respectively. Therefore, the engine starter 110 may normally operate and the engine 130 may normally start.

Then, at a sixth time t6, the generator module 120 may charge the battery pack 100 because the engine 130 has been normally started. As a result, the voltage Vb of the battery 10 increases to values compared to values before a second engine-start period, and the current Ib of the battery 10 is lower than 0 because the battery 10 is charged.

Figure 5:
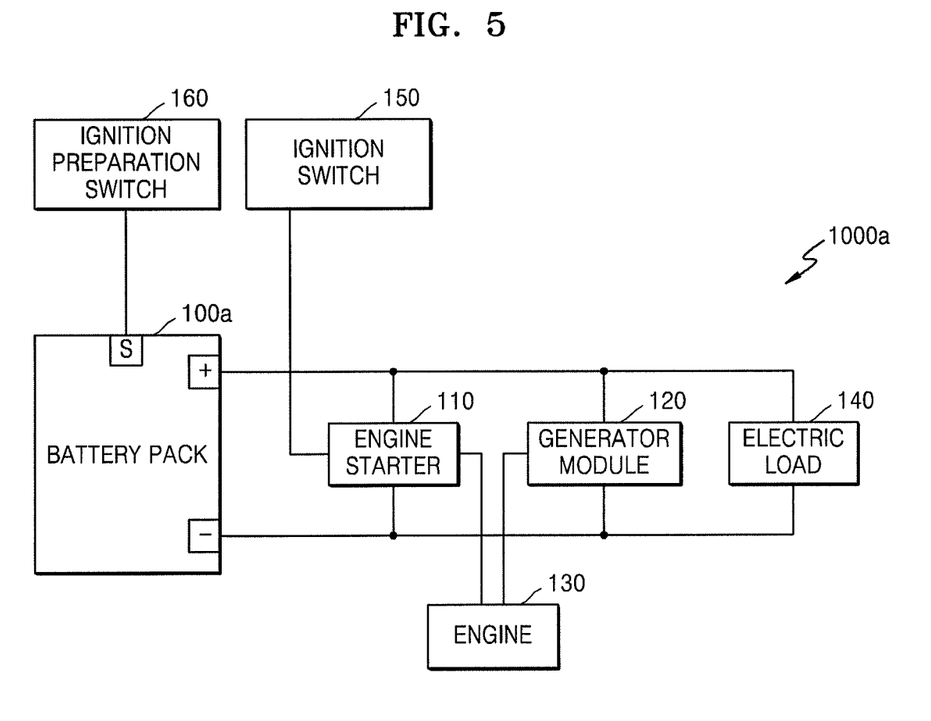
FIG. 5 illustrates another embodiment of a vehicle.

FIG. 5 illustrates another embodiment of a vehicle 1000a which includes a battery pack 100a, an engine starter 110, a generator module 120, an engine 130, an electrical load 140, an ignition switch 150, and an ignition preparation switch 160. The battery pack 100a, the engine starter 110, the generator module 120, the engine 130, and the electrical load 140 of the vehicle 1000a in FIG. 5 may correspond to the battery pack 100, the engine starter 110, the generator module 120, the 130, and the electrical load 140 of the vehicle 1000 with reference to FIG. 1.

The ignition preparation switch 160 outputs an engine-start preparation signal to the battery pack 100a. The ignition preparation switch 160 may be in the vehicle 1000a and may be directly operated by a user. In another example, the vehicle 1000a may include a key equipped with a wireless module, When the key is brought close to the vehicle 1000a, a control unit of the vehicle 1000a may detect approach of the key and control the ignition preparation switch 160 to output an engine-start preparation signal to the battery pack 100a. The ignition preparation switch 160 may, for example, be in the control unit of the vehicle 1000a. In another example, when a key is inserted into a key box, the ignition preparation switch 160 may output an engine-start preparation signal to the battery pack 100a.

When a user operates the ignition switch 150, the ignition switch 150 outputs an engine-start signal to the engine starter 110. In FIG. 5, the ignition switch 150 and the ignition preparation switch 160 are illustrated as separate devices. In another embodiment, the ignition switch 150 and the ignition preparation switch 160 may be in a same combined unit. When the ignition switch 150 is operated, an engine-start preparation signal may be output to the battery pack 100a and an engine-start signal may be output to the engine starter 110.

Figure 6:
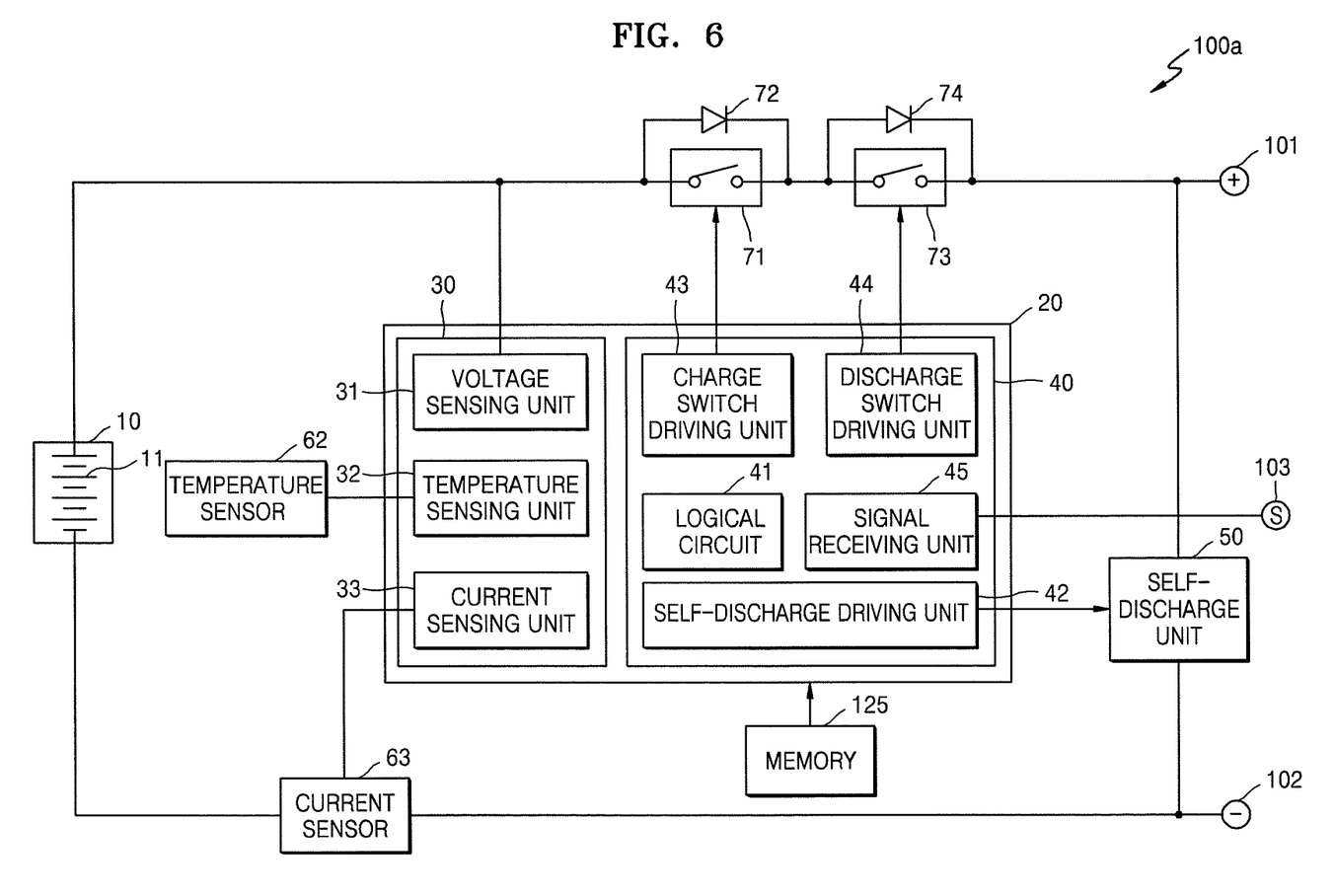
FIG. 6 illustrates another embodiment of a battery pack.

The battery pack 100a includes a signal terminal 103 as well as a pair of external terminals (e.g., first and second external terminals 101 and 102) connected to the engine starter 110 (refer to FIG. 6). When the battery pack 100a receives the engine-start preparation signal through the signal terminal 103, the battery pack 100a compares the temperature of a battery 10 (refer to FIG. 6) with a reference temperature value. When the temperature of the battery 10 is lower than the reference temperature value, the battery pack 100a outputs a self-discharge signal to a self-discharge unit 50 (refer to FIG. 6). Based on the self-discharge signal, the self-discharge unit 50 may self-discharge the battery 10 to increase the temperature of the battery pack 100a to the reference temperature value.

FIG. 6 illustrates another embodiment of the battery pack 100a which includes the signal terminal 103 and the pair of first and second external terminals 101 and 102 connected to the engine starter 110 (refer to FIG. 5).

The battery pack 100 includes the battery 10, a sensing unit 30, a control unit 40, and the self-discharge unit 50. The battery 10 includes one or more battery cells 11 connected between the pair of first and second external terminals 101 and 102. The sensing unit 30 detects the temperature of the battery 10. The control unit 40 includes a signal receiving unit 45 to receive an engine-start preparation signal from an external device such as the ignition preparation switch 160 (refer to FIG. 5) through the signal terminal 103. When the control unit 40 receives an engine-start preparation signal through the signal receiving unit 45, the control unit 40 compares the temperature of a battery 10 with the reference temperature value. When the temperature of the battery 10 is lower than the reference temperature value, the control unit 40 outputs a self-discharge signal to the self-discharge unit 50. The self-discharge unit 50 is connected between the pair of first and second external terminals 101 and 102 in parallel with the battery 10, for self-discharging the battery 10 based on the self-discharge signal and thus increasing the temperature of the battery 10 by self-heating of the battery 10.

The battery pack 100a has substantially the same structure as the battery pack 100 in FIG. 2, except that the battery pack 100a includes the signal receiving unit 45 and the signal terminal 103 to receive an engine-start preparation signal. The battery pack 100 in FIG. 2 self-discharges the battery 10 according to the temperature of the battery 10 if an engine-start attempt is detected by an internal algorithm of the logical circuit 41. However, the battery pack 100a in FIG. 6 is different from the battery pack 100 in that the battery pack 100a self-discharges the battery 10 according to the temperature of the battery 10 if the battery pack 100a receives an engine-start preparation signal from an external device.

If the battery 10 is self-discharged for maintaining the temperature of the battery 10 at a constant level, the logical circuit 41 of the battery 10 may be operated even when the vehicle 1000 or 1000a is parked. Also, a self-discharge operation may be performed once in a while. In this case, electrical energy stored in the battery 10 may be unnecessarily consumed. Particularly, in winter, the battery 10 may be frequently self-discharged due to low temperatures, and thus the battery 10 may be fully discharged within a relatively short time period.

However, in accordance with at least one embodiment, a self-discharge operation is restrictively performed only before or after an engine-start attempt. Therefore, when the vehicle 1000 or 1000a is parked, electrical energy of the battery 10 may not be wasted for self-discharging the battery 10. In addition, the logical circuit 41 of the battery pack 100 or 100a may be deactivated to reduce power consumption.

The control units and other processing circuits may be implemented in logic which, for example, may include hardware, software, or both. When implemented at least partially in hardware, the control and other processing circuits may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the control units and other processing circuits may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with another embodiment, an apparatus includes an interface and a controller to control an engine-start attempt. The interface may take various forms. For example, when the controller is embodied in an integrated circuit chip, the output may be one or more output terminals, leads, wires, ports, signal lines, or other type of interface without or coupled to the controller. The controller may be, for example, control unit 40 or any element therein.

The controller may perform operations of the operations of the control unit 40 of any of the previous embodiments or any of the operations of the methods previously described. For example, the controller may compare a temperature of a battery for the engine-start attempt with a reference temperature and to generate a self-discharge signal when the temperature of the battery is lower than the reference temperature. The self-discharge signal to be output through the interface to control a self-discharge circuit (e.g., self-discharge driving unit 42) for the battery.

The controller may receive instructions for the engine-start attempt from a storage area in or coupled to the controller. The storage area may correspond, for example, to memory 125 in FIGS. 2 and 6 which are coupled to control unit 40. The self-discharge signal may control the self-discharge circuit to self-discharge the battery for a period of time until the temperature of the battery equals or exceeds the reference temperature. The period of time may include a period for heat generated by self-discharge of the battery to raise the temperature of the battery to equal or exceed the reference temperature. The reference temperature may be based on a temperature range in which the battery is unable to output sufficient voltage for the engine-start attempt.

In accordance with another embodiment, a computer-readable medium stores code for operating a controller to perform an engine-start operation of a vehicle. The code includes code for performing the operations of any of the aforementioned embodiments of the controller, control unit 40, or methods. For example, the code may include first code to compare a temperature of a battery for an engine-start attempt with a reference temperature; and second code to generate a self-discharge signal when the temperature of the battery is lower than the reference temperature, the self-discharge signal to be output through the interface to control a self-discharge circuit for the battery. The code may be stored, for example, in memory 125.

In accordance with another embodiment, a method for controlling an engine-start operation includes storing code in a storage area, the code including: first code to compare a temperature of a battery for an engine-start attempt with a reference temperature; and second code to generate a self-discharge signal when the temperature of the battery is lower than the reference temperature, the self-discharge signal to be output through the interface to control a self-discharge circuit for the battery. The code may also include additional code to perform the operations or steps of the methods of any of the previous embodiments.

By way of summation and review, it is difficult to start an engine under various conditions including but not limited to cold weather. In accordance with one or more embodiments, a secondary battery is used for performing an engine-start operation of a vehicle. When the temperature of the secondary battery is below a reference temperature and/or one or more engine-start attempts have failed, a self-discharge operation is performed for the secondary battery until the heat generated by the self-discharge operation raises the temperature of the secondary battery above the reference temperature, at which engine start may be more reliably performed.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A battery pack, comprising:
a battery including at least one battery cell connected between a pair of external terminals, the pair of external terminals connected to an engine starter for starting an engine;
a sensor to detect a temperature of the battery and a current of the battery;
a controller to:
   detect an engine-start attempt to start the engine using the engine starter based on the temperature of the battery,
   compare the temperature of the battery with a reference temperature value after detecting the engine-start attempt, and
   output a self-discharge signal when the temperature of the battery is lower than the reference temperature value; and
a self-discharge circuit connected between the pair of external terminals in parallel with the battery, the self-discharge circuit to self-discharge the battery based on the self-discharge signal to increase the temperature of the battery, wherein
the sensor is to detect a voltage of the battery, and
the controller is to determine that the engine-start attempt was made but failed when the voltage of the battery become lower than a reference voltage value at a time when the current of the battery exceeds a reference current value.

2. The battery pack as claimed in claim 1, wherein the controller is to:
   determine that the engine-start attempt was made based on the current of the battery in excess of the reference current value;
   determine that the engine-start attempt was failed when the voltage of the battery becomes lower than the reference voltage value at the time when the current of the battery exceeds the reference current value;
   determine that the engine-start attempt was completed when the current of the battery becomes lower than the reference current value;
   compare the temperature of the battery with the reference temperature value after determining that the engine-start attempt was made but failed; and
   output the self-discharge signal to the self-discharge circuit to self-discharge the battery using the self-discharge circuit when the temperature of the battery is lower than the reference temperature value.

3. The battery pack as claimed in claim 1, wherein:
the sensor is to detect a voltage of the battery, and
the controller is to:
   determine that the engine-start attempt was made when the current of the battery becomes higher than a reference current value and then falls below the reference current value;
   determine whether the engine-start attempt has succeeded by comparing a first voltage of the battery measured before the current of the battery becomes higher than the reference current value with a second voltage of the battery measured after the current of the battery becomes lower than the reference current value;
   determine that the engine-start attempt has failed when the second voltage is lower than the first voltage;
   compare the temperature of the battery with the reference temperature value after determining that the engine-start attempt was made but failed; and
   output the self-discharge signal to the self-discharge circuit to self-discharge the battery using the self-discharge circuit when the temperature of the battery is lower than the reference temperature value.

4. The battery pack as claimed in claim 1, wherein the controller is to:
   monitor the temperature of the battery while outputting the self-discharge signal, and
   stop outputting the self-discharge signal when the temperature of the battery becomes equal to or higher than the reference temperature value.

5. The battery pack as claimed in claim 1, wherein the controller is to output the self-discharge signal and stop outputting the self-discharge signal after a predetermined time period based on an initial temperature of the battery compared with the reference temperature value.

6. The battery pack as claimed in claim 5, wherein:
the battery is self-discharged to generate heat during the predetermined time period, and
the heat to be generated in a sufficient amount that the temperature of the battery is equal to or higher than the temperature reference value after the predetermined time period.

7. The battery pack as claimed in claim 5, wherein the controller is to store information indicative of the predetermined time period during which the self-discharge signal is output based on the initial temperature of the battery.

8. The battery pack as claimed in claim 1, wherein the self-discharge circuit includes a self-discharge switch to connect the pair of external terminals with each other based on the self-discharge signal.

9. The battery pack as claimed in claim 1, wherein:
the self-discharge circuit includes a self-discharge switch and a self-discharge resistor that are connected in series between the pair of external terminals, and
the self-discharge switch is to be turned on or off based on the self-discharge signal.

10. A vehicle comprising the battery pack of as claimed in claim 1.

11. The battery pack as claimed in claim 1, wherein
the controller is to determine that the engine-start attempt was made when the current of the battery becomes higher than a reference current value.

* * * * *